United States Patent [19]

Schinkel et al.

[11] Patent Number: 4,842,930
[45] Date of Patent: Jun. 27, 1989

[54] HEAT-SEALABLE MULTI-LAYER FILMS OF POLYOLEFINS

[75] Inventors: Ingo Schinkel, Walsrode; Jürgen Böhner, Bomlitz, both of Fed. Rep. of Germany

[73] Assignee: Wolff Walsrode Aktiengesellschaft, Walsrode, Fed. Rep. of Germany

[21] Appl. No.: 72,311

[22] Filed: Jul. 13, 1987

[30] Foreign Application Priority Data

Jul. 19, 1986 [DE] Fed. Rep. of Germany ....... 3624543

[51] Int. Cl.$^4$ .............................................. B32B 27/00
[52] U.S. Cl. ................................... 428/349; 428/500; 428/516; 525/240
[58] Field of Search ...................... 428/349, 500, 516; 525/240

[56] References Cited

U.S. PATENT DOCUMENTS

| | | | |
|---|---|---|---|
| T948,006 | 7/1976 | Ealding | 428/515 |
| 4,275,120 | 7/1981 | Weiner | 428/516 |
| 4,291,092 | 9/1981 | Weiner | 525/240 |
| 4,303,708 | 12/1981 | Gebhardt et al. | 428/349 |
| 4,339,494 | 7/1982 | Weiner | 525/240 |
| 4,339,495 | 7/1982 | Weiner | 525/240 |
| 4,339,496 | 7/1982 | Weiner | 525/240 |
| 4,348,457 | 9/1982 | Rosenthal et al. | 428/349 |
| 4,400,428 | 8/1983 | Rosenthal et al. | 428/349 |
| 4,502,263 | 3/1985 | Crass et al. | 428/349 |
| 4,643,945 | 2/1987 | Kiang | 428/349 |
| 4,666,772 | 5/1987 | Schinkel et al. | 428/515 |
| 4,675,247 | 6/1987 | Kitamura et al. | 428/349 |

FOREIGN PATENT DOCUMENTS

| | | | |
|---|---|---|---|
| 3444158 | 6/1986 | Fed. Rep. of Germany | 428/349 |
| 2030927 | 4/1980 | United Kingdom | 428/349 |
| 0184094 | 6/1984 | United Kingdom | |
| 0118060 | 9/1984 | United Kingdom | |

OTHER PUBLICATIONS

European Search Report (EP 87 10 9967).

*Primary Examiner*—Edith Buffalow
*Attorney, Agent, or Firm*—Sprung, Horn, Kramer & Woods

[57] ABSTRACT

Heat-sealable, at least monoaxially orientated multi-layer film of a base layer of a polypropylene and at least one heat-sealable layer of 1. 35 to 70% by weight, preferably 38 to 60% by weight, of olefin polymers of
   (A) at least one terpolymer consisting of
      (a) 65 to 82% by weight of propylene,
      (b) 25 to 14% by weight of butene-1,
      (c) 10 to 4% by weight of ethylene, and
   (B) 0 to 7% by weight of a copolymer of ethylene and butene-1,
   wherein the sum of (A) and (B) or of (a) to (c) must always give 100% by weight and the monomer content of components (A) and (B) must always give 65 to 82% by weight of propylene, 25 to 14% by weight of butene-1 and 10 to 4% by weight of ethylene,
2. 65 to 30% by weight, preferably 62 to 40% by weight, of a propylene/ethylene copolymer with 2 to 6% by weight of ethylene, wherein the sum of 1. and 2. must always give 100% by weight, and
3. if appropriate customary auxiliaries and additives.

6 Claims, No Drawings

HEAT-SEALABLE MULTI-LAYER FILMS OF POLYOLEFINS

The present invention relates to polyolefinic multi-layer films with a low temperature at which sealing starts, a good seal strength and excellent properties in use, which are therefore particularly suitable as wrapping films.

Multi-layer films of polyolefins which have a polypropylene base layer and a heat-sealable layer of a propylene copolymer have been known for a long time, c.f. DE-A-1 694 694. These films have a relatively high temperature at which sealing starts, in fact $\geq 120°$ C., so that they have only limited suitability above all for wrap-packaging sensitive good.

It is also known that multi-layer films which have a heat-sealable layer containing polybut-1-ene or co- and-/or terpolymers of butene-1, such as, for example, mixtures of ethylene/propylene/butene-1 terpolymers and-/or propylene/butene-1 copolymers, have a low temperature at which sealing starts with a sufficiently high seal strength. Reference is made to U.S. Pat. No. 4,275,120 and the brochure Tafmer XR by Mitsui Petrochemical. Such sealing layers as a general rule, however, have the disadvantage that their optical properties are greatly impaired by mechanical influences and also that their use properties, such as their antiblock properties in vending machines, do not meet the requirements. The use of these multi-layer films is therefore also limited.

There was therefore the object of providing multi-layer films which do not have the disadvantages mentioned and are therefore outstandingly suitable as wrapping films, in particular for foodstuffs and cigarette packets.

Surprisingly, this was achieved by providing the multi-layer films according to the invention, the sealing layer of which consists of a mixture of an ethylene/-propylene/butene terpolymer, if appropriate and ethylene/butene-1 copolymer, and a propylene/ethylene copolymer. Completely unexpectedly, such multi-layer films within a certain mixing range of the components mentioned have an almost constant low temperature at which sealing starts with a sufficiently high seal strength, and not only outstanding optical properties but also very good mechanical properties, such as scratch resistance. It is particularly surprising here that, in spite of a high content of propylene/ehtylene copolymers in the sealing layer material, the temperature at which sealing starts remains below 100° C. In this mixing range, the multi-layer films according to the invention also have a sufficiently good practicability in vending machines.

The present invention therefore relates to heat-sealing, at least monoaxially orientated multi-layer films of a base layer of a polypropylene and at least one heat-sealable layer of olefin polymers, characterized in that the heat-sealable layer consists of 1. 35 to 70% by weight, preferably 38 to 60% by weight, of olefin polymers of
   (A) at least one terpolymer consisting of
   (a) 65 to 82% by weight of propylene,
   (b) 25 to 14% by weight of butene-1,
   (c) 10 to 4% by weight of ethylene, and
   (B) 0 to 7% by weight of a copolymer of ethylene and butene-1, wherein the sum of (A) and (B) or of (a) to (c) must always give 100% by weight and the monomer content of components (A) and (B) must always give 65 to 82% by weight of propylene, 25 to 14% by weight of butene-1 and 10 to 4% by weight of ethylene, 2. 65 to 30% by weight, preferably 62 to 40% by weight, of a propylene/ethylene copolymer with 2 to 6% by weight, preferably 3 to 5% by weight, of ethylene, wherein the sum of 1. and 2. must always give 100% by weight, and 3. if appropriate customary auxiliaries and additives, The base layer consists of a polypropylene. An isotactic polypropylene with a density of 0.9 to 0.91 g/cm$^3$ and a melt flow index of 1 to 4 g/10 minutes at 230° C./21.2 N (in accordance with DIN 53 735) is preferably used.

The base layer can contain 3 to 15% by weight, preferably 8 to 12% by weight, of additives which are incompatible with the polypropylene, preferably inorganic additives, such as calcium carbonate, silicon dioxide, sodium aluminium silicate and/or titanium dioxide, whereupon an opaque film can be achieved. However, an organic incompatible additive can also be contained finely dispersed in the base layer, preferably particles of polystyrene, polymethyl methacrylate, polytetrafluoroethylene, polycarbonate and/or copolymers of these compounds. Incompatible here means that such polymeric additives have a different melting point and/or different stretching ratio to the polypropylene, so that during the biaxial orientation process of the multi-layer film, the polymer matrix tears and vacuoles thus result, these also arising when inorganic additives are used. The present invention therefore also furthermore relates to opaque multi-layer films which contain the heat-sealable layer according to the invention.

The olefin polymers (A) of the heat-sealable layer, which are composed of a propylene/butene-1/ethylene terpolymer and, if appropriate, an ethylene/butene-1 copolymer, should preferably have a melt flow index of 0.1 to 16 g/10 minutes at 230° C. and 21.2 N (DIN 53 735), particularly preferably 4 to 10 g/10 minutes at 230° C. and 21.2 N. The preparation of the random terpolymers and the random copolymers is prior art and is described, for example, in Japanese Published Specification JA-OS 35,487/1974. They are common commercial products.

Component 2. of the heat-sealable material is a propylene/ethylene copolymer, which preferably has a melt index (measured in accordance with DIN 53735) of 0.1 to 25, preferably between 3 and 10 g/10 minutes at 230° C. and 21,2 N. The preparation of such random copolymers is known to the expert and they are available as commercial products.

The heat-sealable multi-layer films according to the invention can also contain a gas barrier layer, preferably an oxygen barrier layer, of a hydrolysed ethylene/vinyl acetate copolymer with 40 to 85 mol% of vinyl acetate units, which are hydrolysed to the extent of at least 90% by weight, preferably to the extent of more than 96% by weight, and if appropriate customary adhesion promoter layers. The preparation of such ethylene/vinyl alcohol copolymers is known. The present invention therefore also furthermore relates to heatsealing multi-layer films which have a low gas permeability and an outstanding aroma protection.

The layers of the multi-layer films according to the invention can be finished with customary additives and auxiliaries, such as, for example, lubricants, antiblock agents and antistatistics, in the customary amounts.

The multi-layer films according to the invention can be produced by customary processes, such as lamination, coating or melt (co)extrusion, and the heat-sealable layer material can preferably be prepared by direct compounding. The multi-layer films according to the invention are stretched at least monoaxially, preferably biaxially. In this process, the longitudinal stretching is preferably carried out in a ratio of 5:1 to 7:1 and the transverse stretching is carried out in a ratio of 7:1 to 10:1.

The polypropylene base film in the multi-layer films according to the invention should preferably be 20 to 50 $\mu$m thick, and the heat-sealable layer should preferably be 0.8 to 2 $\mu$m, particularly preferably about 1 $\mu$m, thick.

The multi-layer films according to the invention are particularly suitable as a packaging material, in particular a wrapping films, preferably for foodstuffs and cigarette packs, and for this purpose can also be printed and provided with tear-open strips. Particularly preferred packaging materials are those which have a heat-sealable layer on both surfaces of the base layer.

The following test methods are used to determine the values in the examples which follow:

the clouding was determined in accordance with ASTM D 1003-61.

The gloss was determined according to ASTM D 245-70 using a gloss meter sold by the company Gardner, based on the 45° geometry.

To determine the strength of the sealing means, the seal strength is tested at a low sealing pressure. The seal strength here is understood as the force required to separate a sealing seam produced under defined conditions (0.35N per cm$^2$, 0.5 second, smooth sealing beams) at the sealing temperatures shown in the table. The seal strength is stated in newtons and is based on a test strip 15 mm wide.

To determine the scratch resistance, the clouding determined using the Ulbricht ball is ascertained. The clouding of a foil is measured, as described above, before and after scratching. Scratching is effected with the aid of 42 g of dust-free silicon carbide, which is scattered over a film inclined at 45° to the horizontal.

To determine the workability in vending machines, the vending machine block value is measured by the vending machine block test. This block value is understood as the force required to separate, by shearing, two wooden models wrapped in a film and stored in a drying cabinet at a defined temperature for a defined test period. The force required for the separation is stated in N. To carry out testing, in each case two wooden models (72×42×10 mm with a weight of 0.3N) wrapped in the film to be tested are placed, with the test surfaces (onto which felt is stuck) on top of one another, in the heating cabinet preheated at 65° C. and are loaded with weights (2N) also preheated to 65° C. The wooden models (test surface 30 cm$^2$) wrapped in the film to be tested are left under this load for 2.25 hours and, after removal from the heating cabinet, are cooled for 1½ hours. After this cooling period, the models wrapped in the film to be tested are placed in the draw-off device of a tensile testing machine and separated by shearing. The force required for this is measured in N. The test speed on the tensile testing machine is 100 mm/minute. The setting time is 2 seconds.

EXAMPLE

To prepare the heat-sealable material, a propylene-/ethylene copolymer is mixed is mixed in the weight ratios given in the following table with a random terpolymer of 71% by weight of propylene units, 20% by weight of butene-1 units and 9% by weight of ethylene units with a melt index of 7 g/10 minutes at 230° C./21.2N, 2% by weight of stearylamide, 0.15% by weight of a thermoplastic polyamide 12 as a spacer, 0.5% by weight of erucylamide and 0.5% by weight of N,N-bis-(2-hydroxyethyl)-($C_{12}$ to $C_{16}$)-alkylamine and is combined and stretched, by customary processes, with the base film of polypropylene with a density of 0.905 g/cm$^3$ and a melt index of 3.3 g/10 minutes at 230° C./21.2N, so that a combined film with longitudinal stretching in a ratio of 5 : 1 and transverse stretching in a ratio of 10:1 is obtained, the base film being 18$\mu$ thick and the sealing layers on both surfaces of the base layer each being 1 $\mu$m thick.

TABLE

|  | Terpolymer:P/E copolymer | | |
| --- | --- | --- | --- |
|  | *100:0 | 58:42 | 39:61 |
| Haze (%) | 1.5 | 1.4 | 1.4 |
| Gloss (GU) | 87/87.2 | 88.1/87.7 | 89/88.6 |
| Scratch resistance | 1.1/23 | 1.0/19.4 | 1.0/19.4 |
| Low pressure sealing Seal strength (N/15 mm) | | | |
| 90° C. | 1.61 | 1.68 | 1.37 |
| 95° C. | 1.98 | 2.09 | 1.78 |
| 100° C. | 2.29 | 2.39 | 2.19 |
| Block value (N) | 39.6 | 10.2 | 7.6 |

*Comparison

We claim:

1. A heat-sealable, at least monoaxailly oriented multi-layer film of a base layer of a polypropylene and at least one heat-sealable layer of an olefin polymer, the heat-sealable layer consisting essentially of
   (I) 35 to 70% by weight of an olefin polymer of
      (A) at least one terpolymer consisting of
         (a) 65 to 82% by weight of propylene,
         (b) 25 to 14% by weight of but-1-ene,
         (c) 10 to 4% by weight of ethylene, and
      (B) 0 to 7% by weight of a copolymer of ethylene and butene-1,
      the sum of (A) and (B) or of (a), (b) and (c) equalling 100% by weight and the monomer content of components A) and B) comprising 65 to 82% by weight of propylene, 25 to 14% by weight of butene-1 and 10 to 4% by weight of ethylene, and
   (II) 65 to 30% by weight of a propylene/ethylene copolymer with 2 to 6% by weight of ethylene.

2. A film according to claim 1, wherein I comprises 38 to 60% by weight and II 62 to 40% by weight of I plus II.

3. A multi-layer film according to claim 1, which is opaque wherein the base layer contains 3 to 15% by weight of at least one incompatible inorganic or organic additive in particle form.

4. A multi-layer film according to claim 1, further including a gas barrier layer of a hydrolyzed ethylene-/vinyl acetate copolymer and optionally an adhesion promoter layer.

5. A foodstuff wrapped in a film according to claim 1.

6. A package of cigarettes wrapped in a film according to claim 1.

* * * * *